(12) United States Patent
Pannem et al.

(10) Patent No.: US 9,710,296 B2
(45) Date of Patent: Jul. 18, 2017

(54) ALLOCATING COST OF DISK USAGE TO A LINKED CLONE VIRTUAL MACHINE

(71) Applicant: VMware, Inc., Palo Alto, CA (US)

(72) Inventors: Hemanth Kumar Pannem, Palo Alto, CA (US); Akshay Prabhakar Mirajkar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/565,135

(22) Filed: Dec. 9, 2014

(65) Prior Publication Data

US 2016/0162314 A1 Jun. 9, 2016

(51) Int. Cl.
*G06F 9/46* (2006.01)
*G06F 9/455* (2006.01)
*G06F 3/06* (2006.01)

(52) U.S. Cl.
CPC ............ *G06F 9/45558* (2013.01); *G06F 3/06* (2013.01); *G06F 2009/45562* (2013.01); *G06F 2009/45579* (2013.01); *G06F 2009/45583* (2013.01)

(58) Field of Classification Search
CPC ....... G06F 9/45533; G06F 2009/45583; G06F 2009/45562; G06F 3/06; G06F 2009/45579; G06F 9/45558
See application file for complete search history.

(56) References Cited

U.S. PATENT DOCUMENTS

| | | | |
|---|---|---|---|
| 7,499,968 B1 * | 3/2009 | Alexander | G06Q 10/06 705/412 |
| 8,694,400 B1 * | 4/2014 | Certain | G06Q 30/00 705/26.3 |
| 2003/0092007 A1 | 5/2003 | Gibbs et al. | |
| 2005/0059041 A1 | 3/2005 | Johnson et al. | |
| 2007/0171921 A1 | 7/2007 | Wookey et al. | |
| 2007/0174410 A1 | 7/2007 | Croft et al. | |
| 2007/0174429 A1 | 7/2007 | Mazzaferri et al. | |
| 2007/0179955 A1 | 8/2007 | Croft et al. | |
| 2007/0180447 A1 | 8/2007 | Mazzaferri et al. | |
| 2007/0180448 A1 | 8/2007 | Low et al. | |
| 2007/0180449 A1 | 8/2007 | Croft et al. | |
| 2007/0180450 A1 | 8/2007 | Croft et al. | |

(Continued)

OTHER PUBLICATIONS

Understanding Clones, VMware Workstation 5.0, https://www.vmware.com/support/ws5/doc/ws_clone_overview.html, 2 pages, accessed Dec. 9, 2014.
Cormac Hogan, Linked Clones Part 1—Fast Provisioning in vCloud Director 1.5, VMware vSphere Blog, http://blogs.vmware.com/vsphere/2011/11/linked-clones-part-1-fast-provisioning-in-vcloud-director-15.html, Nov. 16, 2011, 9 pages.

(Continued)

*Primary Examiner* — Camquy Truong

(57) ABSTRACT

The present disclosure is related to methods, systems, and machine-readable media for allocating cost of disk usage to a linked clone virtual machine (VM). A determination can be made as to a number of disks used by a linked clone VM, among the disks in a software defined data center, over a time period. In some examples, a cost for a total usage of the number of disks over the time period can be allocated to the linked clone VM, regardless of whether the total usage over the time period includes usage by other VMs. In some examples, a cost for a total usage of the number of disks over the time period can be allocated to the linked clone VM, in proportion to the number of VMs that use the disk regardless of relative usage of the disk by each of the number of VMs.

22 Claims, 4 Drawing Sheets

(56) References Cited

U.S. PATENT DOCUMENTS

| | | |
|---|---|---|
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2009/0075841 A1 | 3/2009 | Johnson et al. |
| 2010/0070978 A1* | 3/2010 | Chawla ............... G06F 9/5077 718/105 |
| 2012/0245037 A1 | 9/2012 | Hogers et al. |
| 2012/0303923 A1 | 11/2012 | Behera et al. |
| 2012/0331462 A1 | 12/2012 | Falko |
| 2013/0196859 A1 | 8/2013 | Van Eijk et al. |
| 2013/0212161 A1 | 8/2013 | Ben-Shaul et al. |
| 2013/0212480 A1 | 8/2013 | Ben-Shaul et al. |
| 2013/0212579 A1 | 8/2013 | Ben-Shaul et al. |
| 2013/0219286 A1 | 8/2013 | Ben-Shaul et al. |
| 2013/0227558 A1 | 8/2013 | Du et al. |
| 2014/0149347 A1 | 5/2014 | Ben-Shaul et al. |

OTHER PUBLICATIONS

Understanding Snapshots, VMware Workstation 5.0, https://www.vmware.com/support/ws5/doc/ws_preserve_sshot_understanding.html, 1 page, accessed Dec. 9, 2014.

Allow vSphere to Reclaim Disk Space in Linked-Clone Virtual Machines, VMware Horizon View 5.2 and 5.3 Documentation Center, http://pubs.vmware.com/view-52/index.jsp?topic=%2Fcom.vmware.view.administration.doc%2FGUID-F94492D8-AEC4-4AE4-A159-98EA216E2A28.html, 2 pages, accessed Dec. 9, 2014.

William Lam, Creating SE Sparse Linked Clones Using the vSphere 5.1 API, virtuallyGhetto, http://www.virtuallyghetto.com/2012/09/creating-se-sparse-linked-clones-using.html, Sep. 7, 2012, 6 pages.

Storage I/O Control, vSphere, http://www.vmware.com/products/vsphere/features-storage-io-control, 6 pages, accessed Dec. 9, 2014.

* cited by examiner

ALLOCATING COST OF DISK USAGE TO A LINKED CLONE VIRTUAL MACHINE

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual machines (VMs) have been introduced to lower data center capital investment in facilities and operational expenses and reduce energy consumption. A VM is a software implementation of a computer that executes application software analogously to a physical computer. VMs have the advantage of not being bound to physical resources, which allows VMs to be moved around and scaled to meet changing demands of an enterprise without affecting the use of the enterprise's applications.

In a software defined data center, storage resources may be allocated to VMs in various ways, such as through network attached storage (NAS), a storage area network (SAN) such as fiber channel and/or Internet small computer system interface (iSCSI), and/or raw device mappings, among others. VMs may run operating systems and/or applications. Installing operating systems and/or applications may be time consuming. Accordingly, a virtualization technology called clones may be used to reduce the time in setup and to reuse already setup images for VMs.

DETAILED DESCRIPTION

Figure 1:
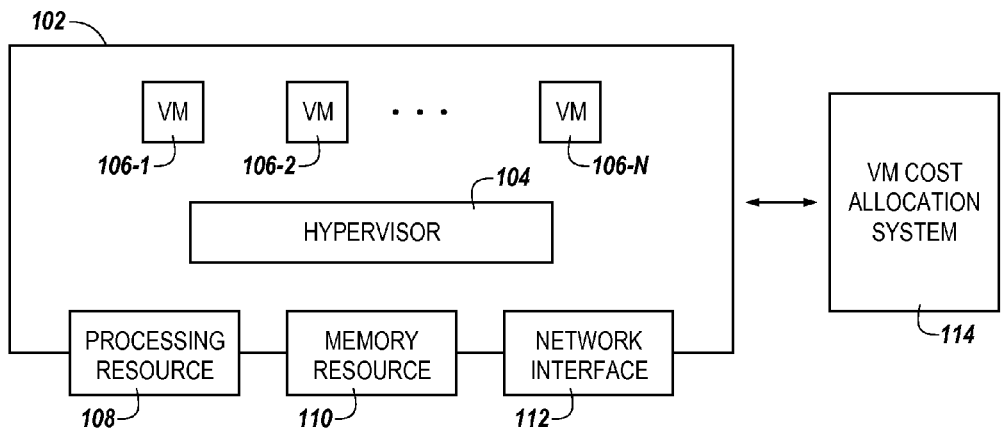
FIG. 1 is a diagram of a host and a system for allocating costs to linked clone virtual machines according to one or more embodiments of the present disclosure.

The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts, VMs, containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

While the specification refers generally to VMs, the examples given could be any type of data compute node, including physical hosts, VMs, non-VM containers, and hypervisor kernel network interface modules. Embodiments of the present disclosure can include combinations of different types of data compute nodes.

Examples of cloned VMs include full clones and linked clones. A full clone is an independent copy of a VM that shares nothing from the parent VM. Thus, for example, any changes to the parent VM made after the full clone is created will not be propagated to the full clone. A linked clone is a copy of a VM that shares disks with the parent VM. Thus, any changes made to the shared disks for the parent VM will be propagated to the linked clone VM. In some instances, linked clone VMs may share some, but not all disks. For example, a parent VM may have a shared disk with a linked clone VM and the parent VM may also have its own delta disk that is not shared with the linked clone VM so that changes for the parent VM can be made in the delta disk and not propagated to the linked clone VM while changes that are intended to affect both the parent VM and the linked clone VM can be made in the shared disk. As used herein with respect to VMs, a "disk" is a representation of memory resources (e.g., memory resources 110 illustrated in FIG. 1) that are used by a VM. As used herein, "memory resource" includes primary storage (e.g., cache memory, registers, and/or main memory such as random access memory (RAM)) and secondary or other storage (e.g., mass storage such as hard drives, solid state drives, removable media, etc., which may include non-volatile memory). The term "disk" does not imply a single physical memory device. Rather, "disk" implies a portion of memory resources that are being used by a VM, regardless of how many physical devices provide the memory resources. Because operating systems and general applications may take up most of the space on the VM disks, which can be duplicated across many VMs, linked clones can help to improve this situation. In addition to saving disk space, linked clones can also help in fast provisioning.

Linked clones can be created using the concept of VM snapshots. A VM snapshot can preserve the state of a VM so that it can be reverted to at a later point in time. The snapshot can include memory as well. In some embodiments, a snapshot includes secondary storage, while primary storage is optionally included with the snapshot. A linked clone VM can be constructed from a snapshot. A snapshot hierarchy and/or linked clone hierarchy can be represented as a tree of disks. The leaves of the tree can represent currently active delta disks. A delta disk can be a disk that stores changes from a parent disk (e.g., without storing an entire copy of the parent disk). Some embodiments of the present disclosure can accurately allocate storage costs for a VM that is using linked clones and/or snapshots (a "linked clone VM") using the linked clone hierarchy.

The tree of disks representing the linked clone hierarchy can become complex as the linked clone levels increase. At a given point in time, there could be multiple VMs sharing the same linked clone in multiple levels. This can complicate the costing of storage consumption per VM in a software defined data center at a given point in time. The complexity of the environment can multiply further when the cost of storage is to be allocated over a time period (e.g., where changes to the hierarchy may be made over the time period). In order to allocate costs to a VM accurately, a determination can be made as to the amount of resources consumed by the VM.

According to a number of embodiments of the present disclosure, costs can be allocated to a linked clone VM based on static parameters. A dynamic parameter is a parameter that changes during runtime, whereas a static parameter is a parameter that does not usually change during runtime. Some examples of static parameters include a size of a disk being used, a number of VMs using the disk, and/or a clone count for the disk, among others. A parameter being static does not mean that the parameter is fixed or cannot change, as, for example, the number of VMs using a disk can change, and a use of the disk (a size of the disk) can change. The term "static" means that changes are rare and do not depend on how the disk is used. Usually changes to a shared disk are rare. For example, a shared operating system disk for VMs is not changed until a patch or update is applied that is propagated to the VMs sharing that disk, and is therefore considered to be a static parameter. Again, the term "disk" represents the memory resources used by a VM and is more indicative of an amount of memory used rather than an indication of one or more physical memory devices. However, such changes may occur outside of runtime, that is, outside of a time where operations are being performed on the disk by a VM. Some examples of dynamic parameters include a number of operations performed on a disk over time and/or a latency for operations performed on the disk. For example, a full cost of the usage of a disk can be attributed to each linked clone VM that uses the disk and/or the cost of the usage can be weighted based on the number of linked clone VMs that use the disk. Some advantages of using static parameters can include that the static parameters are fixed for the given environment, which can provide for a higher performance computation of costs versus computation based on dynamic parameters. Some advantages of using static parameters can include using little or no support from a hypervisor for the cost allocation because dynamic parameters may not be tracked and/or used. Furthermore, the use of static parameters can be easily auditable and measurable, which may be particularly beneficial for service provider environments.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a host and a system for allocating costs to linked clone virtual machines according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual machines 106-1, 106-2, . . . , 106-N (referred to generally herein as "VMs 106"). The VMs can be provisioned with processing resources 108 and/or memory resources 110 and can communicate via the network interface 112. The processing resources 108 and the memory resources 110 provisioned to the VMs can be local and/or remote to the host 102. For example, in a software defined data center, the VMs 106 can be provisioned with resources that are generally available to the software defined data center and not tied to any particular hardware device. By way of example, the memory resources 110 can include volatile and/or non-volatile memory available to the VMs 106. The VMs 106 can be moved to different hosts (not specifically illustrated), such that a different hypervisor manages the VMs 106. The host 102 can be in communication with a VM cost allocation system 114. An example of the VM cost allocation system is illustrated and described in more detail with respect to FIG. 2. In some embodiments, the cost allocation system 114 can be a server, such as a web server.

Figure 2:
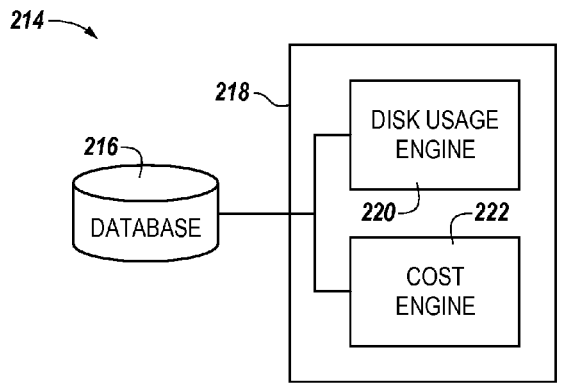
FIG. 2 is a diagram of a system for allocating costs to linked clone virtual machines according to one or more embodiments of the present disclosure.

FIG. 2 is a diagram of a system 214 for allocating costs to linked clone virtual machines according to one or more embodiments of the present disclosure. The system 214 can include a database 216, a subsystem 218, and/or a number of engines, for example disk usage engine 220 and/or cost engine 222, and can be in communication with the database 216 via a communication link. The system 214 can include additional or fewer engines than illustrated to perform the various functions described herein. The system can represent program instructions and/or hardware of a machine (e.g., machine 324 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the disk usage engine 220 can include a combination of hardware and program instructions that is configured to determine, for a linked clone VM, a number of disks used by the linked clone VM among a plurality of disks in a software defined data center over a time period. The disk usage engine 220 can be configured to build a linked clone tree for a number of VMs that use the plurality of disks during the time period. Examples of linked clone trees are illustrated and described in more detail with respect to FIGS. 4A-4D. For each leaf in a linked clone tree, the disk usage engine 220 can be configured to determine a path from a root of the tree. The path can include a number of nodes representing disks used by a VM corresponding to the particular leaf.

In some embodiments, the cost engine 222 can include a combination of hardware and program instructions that is configured to allocate, to the linked clone VM, a cost for a total usage of the number of disks over the time period, regardless of whether the total usage over the time period includes usage by other VMs. For example, a cost for 100% of the linked clone disk capacity can be allocated to each linked clone VM that uses any portion of the disk capacity. The cost engine 222 can be configured to allocate a cost for a total usage of a particular disk during the time period to each of the VMs that use any portion of the particular disk. The cost engine 222 can be configured to allocate the cost for the total usage of the disks based on a unit rate per unit time that is common to the disks (e.g., such that each disk is charged at a same rate) or a unit rate per unit time that is specific to the disks (e.g., such that at least one disk is charged at a different rate).

In some embodiments, the disk usage engine 220 can include a combination of hardware and program instructions that is configured to determine, for a particular linked clone VM, a number of disks, among a plurality of disks in a software defined data center, used by the linked clone VM during a time period. The disk usage engine 220 can be configured to determine a respective number of linked clone VMs that use each of the number of disks during the time period. The disk usage engine 220 can be configured to determine a usage of each of the number of disks during the time period. For example, the disk usage engine 220 can determine the number of disks used by a linked clone VM by determining a path from a root node of a linked clone tree to a leaf node representing a delta disk for the linked clone VM. The disk usage engine 220 can build a separate linked clone tree for each of a plurality of times during the time period and superimpose the plurality of linked clone trees into a single linked clone tree.

In some embodiments, the cost engine 222 can include a combination of hardware and program instructions that is configured to allocate a cost of the usage of each of the number of disks to the particular linked clone VM in proportion to the respective number of linked clone VMs that use each of the number of disks during the time period.

Figure 3:
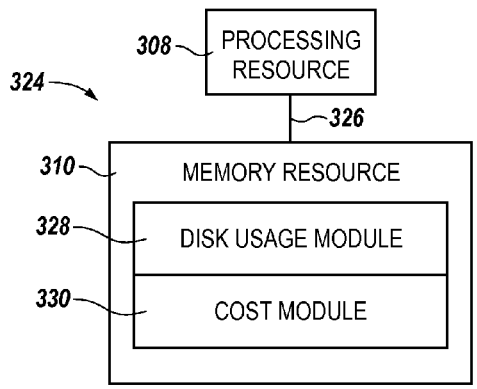
FIG. 3 is a diagram of a machine for allocating costs to linked clone virtual machines according to one or more embodiments of the present disclosure.

FIG. 3 is a diagram of a machine for allocating costs to linked clone virtual machines according to one or more embodiments of the present disclosure. The machine 324 can utilize software, hardware, firmware, and/or logic to perform a number of functions. The machine 324 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 324 (e.g., the machine 324 can include internal memory resources and have access to external memory resources). In some embodiments, the machine 324 can be a VM. The program instructions (e.g., machine-readable instructions (MRI)) can include instructions stored on the MRM to implement a particular function (e.g., an action such as performing seismic interference attenuation on an incoherent portion of separated seismic data). The set of MRI can be executable by one or more of the processing resources 308. The memory resources 310 can be coupled to the machine 324 in a wired and/or wireless manner. For example, the memory resources 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 326. The communication path 326 can be local or remote to the machine 324. Examples of a local communication path 326 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 326 can be such that the memory resources 310 are remote from the processing resources 308, such as in a network connection between the memory resources 310 and the processing resources 308. That is, the communication path 326 can be a network connection. Examples of such a network connection can include a local area network (LAN), wide area network (WAN), personal area network (PAN), and the Internet, among others.

As shown in FIG. 3, the MRI stored in the memory resources 310 can be segmented into a number of modules 328, 330 that when executed by the processing resources 308 can perform a number of functions. As used herein a module includes a set of instructions included to perform a particular task or action. The number of modules 328, 330 can be sub-modules of other modules. For example, the cost module 330 can be a sub-module of the disk usage module 328 and/or can be contained within a single module. Furthermore, the number of modules 328, 330 can comprise individual modules separate and distinct from one another. Examples are not limited to the specific modules 328, 330 illustrated in FIG. 3.

Each of the number of modules 328, 330 can include program instructions and/or a combination of hardware and program instructions that, when executed by a processing resource 308, can function as a corresponding engine as described with respect to FIG. 2. For example, the disk usage module 328 can include program instructions and/or a combination of hardware and program instructions that, when executed by a processing resource 308, can function as the disk usage engine 220 and/or the cost module 330 can include program instructions and/or a combination of hardware and program instructions that, when executed by a processing resource 308, can function as the cost engine 222.

The machine 324 can include a disk usage module 328, which can include instructions to determine, for a disk among a plurality of disks in a software defined data center, a number of VMs, including at least one linked clone VM, that use the disk over a time period. The disk usage module 328 can include instructions to build a linked clone tree for a plurality of VMs that use the plurality of disks during the time period. For each leaf in the tree, the disk usage module 328 can include instructions to determine a path from a root of the tree, where a particular path for a particular leaf includes a number of nodes representing a particular number of disks used by one of the VMs corresponding to the particular leaf. The disk usage module 328 can include instructions to determine, for the linked clone VM, a first disk and a second disk used by the linked clone VM over the time period.

The machine 324 can include a cost module 330, which can include instructions to allocate a cost for a total usage of the disk to each of the number of VMs in proportion to the number of VMs that use the disk regardless of relative usage of the disk by each of the VMs. The cost module 330 can include instructions to allocate a cost for a total usage of the particular number of disks to one of the VMs corresponding to the particular leaf. The cost module 330 can include instructions to allocate, to the linked clone VM, a cost for a total usage of the first disk over the time period in proportion to a total number of VMs that use the first disk over the time period and allocate, the linked clone VM, a cost for a total usage of the second disk over the time period in proportion to a total number of VMs that use the second disk over the time period.

Figure 4A:
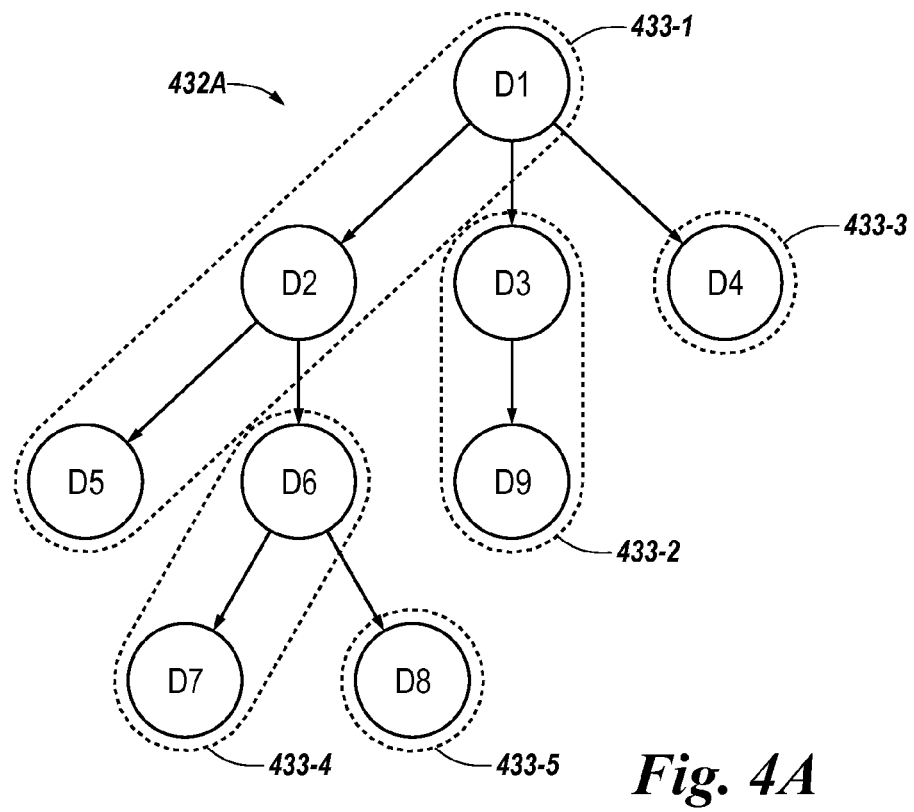
FIG. 4A illustrates a linked clone hierarchy at a first time according to one or more embodiments of the present disclosure.

FIG. 4A illustrates a linked clone hierarchy 432A at a first time according to one or more embodiments of the present disclosure. The linked clone hierarchy 432A represents an example including five VMs (VM1, VM2, VM3, VM4, VM5) to help explain a number of embodiments of the present disclosure. At the outset, VM1 has disk D1. A snapshot can be taken on VM1, which locked disk D1, to create a delta disk D2. As described herein, delta disk D2 can be used to store changes from disk D1, in this example, for VM1. Locking a disk, as used herein, indicates that no further changes to the disk will be made. In this example, VM1 can lock disk D1 when delta disk D2 is created (e.g., so that any further changes for VM1 can be stored on delta disk D2).

From the snapshot of VM1, two linked clone VMs (VM2 and VM3) can be created with delta disks D3 (VM2) and D4 (VM3) respectively. Thus, the linked clone VMs (VM2 and VM3) are linked clones of VM1 in its state as recorded on disk D1. This is illustrated in the linked clone hierarchy by the lines connecting disk D1 to disks D3 and D4 respectively. Thus, any changes to VM1 made after disk D1 was locked and delta disk D2 was created would not be reflected in the linked clones VM2 and VM3 because such changes would be stored in delta disk D2 and the linked clones VM2 and VM3 were snapshots of VM1 according to disk D1 rather than delta disk D2.

An application can be installed in VM1 in delta disk D2. This is a change to VM1 (e.g., installing a new application). As described above, such a change to VM1 would not reach the linked clones VM2 and VM3 because they were cloned from VM1 in its state recorded in disk D1. After the application is installed, a snapshot can be taken on VM1, which locked disk D2 (where the application was installed) and created a new delta disk D5 (e.g., where any further changes for VM1 can be stored).

From the snapshot of VM1 at disk D2, a linked clone (VM4) can be created with delta disk D6. VM4 can write some data into delta disk D6. Subsequently, a snapshot can be taken on VM4, which can lock delta disk D6 to create delta disk D7. Thus, any further changes for VM4 can be reflected in delta disk D7. A linked clone VM (VM5) can be created from VM4 at disk D6 with delta disk D8 for VM5. A VM can make changes to its disk at any time and may not lock the disk unless a snapshot is going to be taken, for example, to preserve a particular state of the VM and/or to create a linked clone VM. The snapshot allows the VM to have a new delta disk for further changes and allows the new linked clone VM to have its own delta disk based on the previous state of the VM from which it was cloned. Thus, for example, a snapshot can be taken on VM2, which can lock disk D3, and create delta disk D9.

In the linked clone hierarchy 432A illustrated in FIG. 4A, various states of VM1 are represented by disks D1, D2, and D5 as illustrated by dotted line 433-1. Various states of VM 2 are represented by disks D3 and D9 as illustrated by dotted line 433-2. A state of VM3 is represented by disk D4 as illustrated by dotted line 433-3. Various states of VM4 are represented by disks D6 and D7 as illustrated by dotted line 433-4. A state of VM5 is represented by disk D8 as illustrated by dotted line 433-5.

The linked clone hierarchy 432A is presented as a linked clone tree. Each disk is presented as a node. A node is a parent node if it has a child node. A child node is a node that depends from a parent node as represented by a line coming from a first node with an arrow toward a second node. Child nodes are generally presented below parent nodes. A parent node that has no parent node of its own is a root node (e.g., disk D1). A child node with no child node of its own is a leaf node (e.g., disks D5, D7, D8, D9, and D4). A leaf node in the linked clone tree represents a current state of a particular VM. Thus, for example, leaf node disk D5 represents a current state of VM1, leaf node disk D7 represents a current state of VM 4, leaf node disk D8 represents a current state of VM5, leaf node disk D9 represents a current state of VM2, and leaf node disk D4 represents a current state of VM3. The linked clone tree illustrated in FIG. 4A represents the linked clone hierarchy 432A at a first time (t1).

Each VM can also have a diskchain, which is a path from the root node to that VM's leaf node, representing its current state. A diskchain for VM1 is D1-D2-D5. A diskchain for VM2 is D1-D3-D9. A diskchain for VM5 is D1-D2-D6-D8. A diskchain for VM4 is D1-D2-D6-D7. A diskchain for VM3 is D1-D4. An example of executable instructions to determine a diskchain for VM4 is: Path(root,VM4). The diskchains for each VM over a particular time period can be superimposed to create a linked clone hierarchy, such as linked clone hierarchy 432A.

Figure 4B:
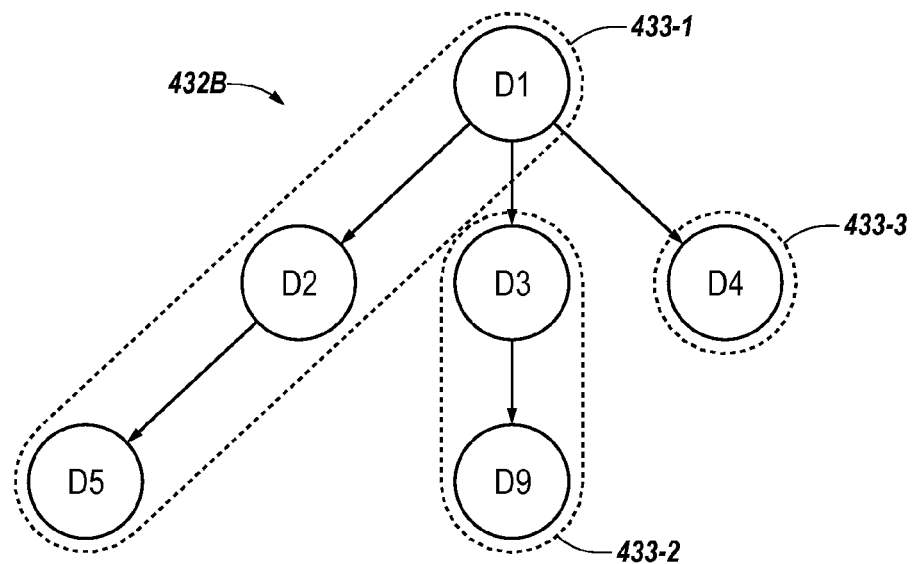
FIG. 4B illustrates the linked clone hierarchy of FIG. 4A at a second time according to one or more embodiments of the present disclosure.

FIG. 4B illustrates the linked clone hierarchy of FIG. 4A at a second time (t2) according to one or more embodiments of the present disclosure. The linked clone hierarchy 432B illustrated in FIG. 4B reflects changes to the linked clone hierarchy 432A illustrated in FIG. 4A where VM4 and VM5 have been deleted (the dependent linked clones can be deleted—linked clone disk D8 can be deleted and hence VM5 got deleted and afterwards VM4 is deleted, which removed disks D6 and D7). Thus, disks D6, D7, and D8 have been removed from the linked clone tree because various states of VM4 were represented by disks D6 and D7 as illustrated by dotted line 433-4 and a state of VM5 was represented by disk D8 as illustrated by dotted line 433-5 and because no other VMs were linked clones of VM4 and VM5.

In the linked clone hierarchy 432B illustrated in FIG. 4B, various states of VM1 are represented by disks D1, D2, and D5 as illustrated by dotted line 433-1. Various states of VM 2 are represented by disks D3 and D9 as illustrated by dotted line 433-2. A state of VM3 is represented by disk D4 as illustrated by dotted line 433-3. Leaf node disk D5 represents a current state of VM1, leaf node disk D9 represents a current state of VM 2, and leaf node disk D4 represents a current state of VM3.

Figure 4C:
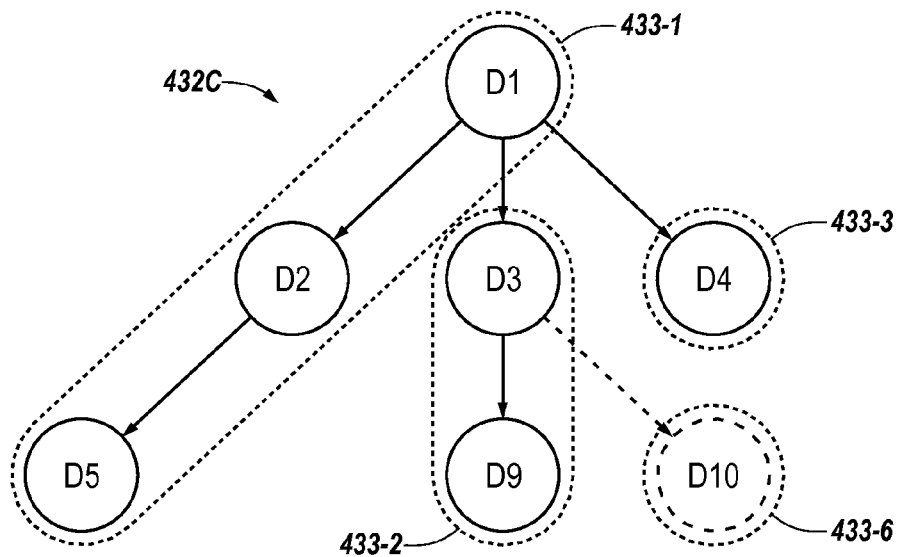
FIG. 4C illustrates the linked clone hierarchy of FIG. 4A at a third time according to one or more embodiments of the present disclosure.

FIG. 4C illustrates the linked clone hierarchy of FIG. 4A at a third time (t3) according to one or more embodiments of the present disclosure. The linked clone hierarchy 432C illustrated in FIG. 4C reflects changes to the linked clone hierarchy 432B illustrated in FIG. 4B where a linked clone created on VM2 in its state represented in disk D3, which was already locked when delta disk D9 was created, to create a delta disk D10 for a new VM (VM6). The dashed lines indicate elements that were added during time t3 (e.g., disk D10 was added).

In the linked clone hierarchy 432C illustrated in FIG. 4C, various states of VM1 are represented by disks D1, D2, and D5 as illustrated by dotted line 433-1. Various states of VM2 are represented by disks D3 and D9 as illustrated by dotted line 433-2. A state of VM3 is represented by disk D4 as illustrated by dotted line 433-3. A state of VM6 is represented by disk D10 as illustrated by dotted line 433-6. Leaf node disk D5 represents a current state of VM1, leaf node disk D9 represents a current state of VM 2, leaf node disk D4 represents a current state of VM3, and leaf node disk D10 represents a current state of VM6.

Figure 4D:
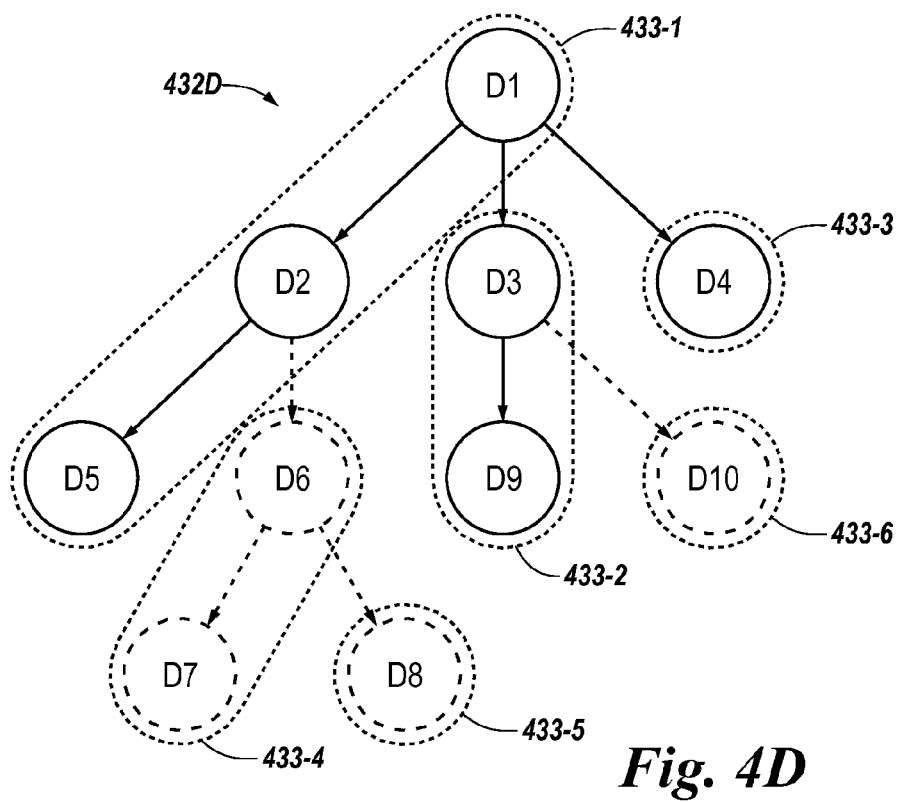
FIG. 4D illustrates a superimposed linked clone hierarchy representing the linked clone hierarchy of FIGS. 4A-4C over the time period from the first time to the third time according to one or more embodiments of the present disclosure.

FIG. 4D illustrates a superimposed linked clone hierarchy representing the linked clone hierarchy of FIGS. 4A-4C over the time period from the first time to the third time (over t1, t2, t3) according to one or more embodiments of the present disclosure. The linked clone hierarchy 432D illustrated in FIG. 4D includes all of the VMs (VM1, VM2, VM3, VM4, VM5, VM6) and all of the disks (D1, D2, D3, D4, D5, D6, D7, D8, D9, D10) that existed over the time period (t1-t3). It is a superimposition of the linked clone hierarchy 432A illustrated in FIG. 4A with the linked clone hierarchy 432B illustrated in FIG. 4B and the linked clone hierarchy 432C illustrated in FIG. 4C. Such a superimposition can be beneficial for allocating costs to linked clone VMs according to a number of embodiments of the present disclosure. The dashed lines indicate elements that are different between times t1, t2, and t3 (e.g., D6, D7, and D8 were removed and D10 was added).

In the linked clone hierarchy 432D illustrated in FIG. 4D, various states of VM1 are represented by disks D1, D2, and D5 as illustrated by dotted line 433-1. Various states of VM 2 are represented by disks D3 and D9 as illustrated by dotted line 433-2. A state of VM3 is represented by disk D4 as illustrated by dotted line 433-3. Various states of VM4 are represented by disks D6 and D7 as illustrated by dotted line 433-4. A state of VM5 is represented by disk D8 as illustrated by dotted line 433-5. A state of VM6 is represented by disk D10 as illustrated by dotted line 433-6.

An example of executable instructions to provide diskchains, which can be used in creating a linked clone hierarchy, is:

```
//The algorithm returns list of diskchains.
//Each diskchain is a list of disks.
Diskchains getDiskChainsBetween(Time t1, Time t2):
    vms = getAllVMs(t1,t2)
    List<LinkedList<Disk>>diskChains = empty list
    for each vm in vms:
        List<VMDisk> vmDisks = vm.getVMDisks(t1,t2)
        for each vmDisk in vmDisks:
            LinkedList<Disk>diskChain =
            vmDisk.getDiskLayout(t1,t2)
            diskChains.add(diskChain)
    return diskchains
```

As will be appreciated, the times (e.g., t1, t2) can be adjusted to provide diskchains over different time periods.

An example of executable instructions to provide a linked clone hierarchy, such as is illustrated in FIGS. 4A-4C is:

```
//The algorithm builds the superimposed tree of diskchains in the duration t1-t2.
Tree buildTree(t1,t2)
    diskchains = getDiskChainsBetween (t1,t2)
    Tree tree;
    for each diskchain in diskchains:
        for each disk in diskchain:
            tree.addNode(disk)
            if (disk.parent != null)
                tree.addEdge(disk,disk.parent);
    return tree
```

As will be appreciated, the times (e.g., t1,t2) can be adjusted to provide a linked clone hierarchy over different time periods.

As described herein, some embodiments can include allocating a cost for 100% of the linked clone disk capacity to each linked clone VM that uses any portion of the disk capacity. An instantaneous cost for a particular VM (e.g., VM4) at time t can be calculated according to:

$$Cost_{VM_4}(t) = \sum_{i \in \{1,2,6,7\}} sizeof(D_i, t) * u(t)$$

where sizeof($D_i$,t) is the actual utilization of the disk at time t and u(t) is the unit rate per unit time (e.g., per gigabyte (GB)-hour) at time t. In some embodiments, the unit rate per unit time can be common to all of the disks. In some embodiments, the unit rate per unit time can vary (can be specific to particular disks) according to:

$$Cost_{VM_4} = \int_{t=t1}^{t2} \left( \sum_{i \in \{1,2,6,7\}} sizeof(D_i, t) * u(D_i, t) \right) dt$$

The size of the last delta disk in the chain can change and/or the unit rate per unit time can change (e.g., for different tasks being performed by a VM or different tiers of storage for different disks and/or VMs). A general cost for any VM can be calculated according to:

$$Cost_{VM_n} = \int_{t=t1}^{t2} \left( \sum_{\substack{i \in nodes \\ \text{in the Path}(root,VM_n)}} sizeof(D_i, t) * u(D_i, t) \right) dt$$

As described herein, some embodiments can include allocating a cost to a linked clone VM based on clone count (the number of VMs sharing the cloned disk). An example of executable instructions to determine a clone count can include:

```
//The algorithm traverses the current linked clone tree to compute the
clone count for the given disk
int getLatestCloneCount(Disk disk) {
    List<Disk> children = disk.getChildren( );
    if children is empty:
        disk.setCloneCount (1);
        return 1;
    int cloneCount = 0;
    for each child in children:
        cloneCount = cloneCount + getCachedCloneCount (child);
    disk.setCloneCount (cloneCount);
    return cloneCount;
}
//This method returns the pre-computed clone count if available
//This method to be used in conjunction with 'refreshCloneCount'
int getCachedCloneCount(Disk disk){
    int count = disk.getCloneCount( );
    if (count is not undefined){
        return disk.getCloneCount( );
    }else{
        Return getLatestCloneCount(disk)
    }
}
//This method refreshes clone count for all the disks in the linked clone
tree.
void refreshCloneCount' (Tree linkedCloneTree){
    //clean clone counts for whole tree by setting clone count for each
    disk node to undefined.
    //refresh the clone counts
    getLatestCloneCount(linkedCloneTree -> getRootDisk( ))
}
```

An instantaneous cost for $VM_4$ can be calculated at time t according to:

$$Cost_{VM_4}(t) = \sum_{i \in \{1,2,6,7\}} \frac{sizeof(D_i, t)}{CC(D_i, t)} * u(t)$$

where sizeof($D_i$,t) is the actual utilization of the disk at time t, CC($D_i$,t) is the clone count for $VM_4$ for disk $D_i$ at time t, and u(t) is the unit rate per unit time (e.g., per gigabyte (GB)-hour) at time t. In some embodiments, the unit rate per unit time can be common to all of the disks. In some embodiments, the unit rate per unit time can vary (can be specific to particular disks). A general cost for any VM can be calculated according to:

$$Cost_{VM_n} = \int_{t=t1}^{t2} \left( \sum_{\substack{i \in nodes \\ \text{in the Path}(root,VN_n)}} \frac{sizeof(D_i, t)}{CC(D_i, t)} * u(D_i, t) \right) dt$$

Figure 5:
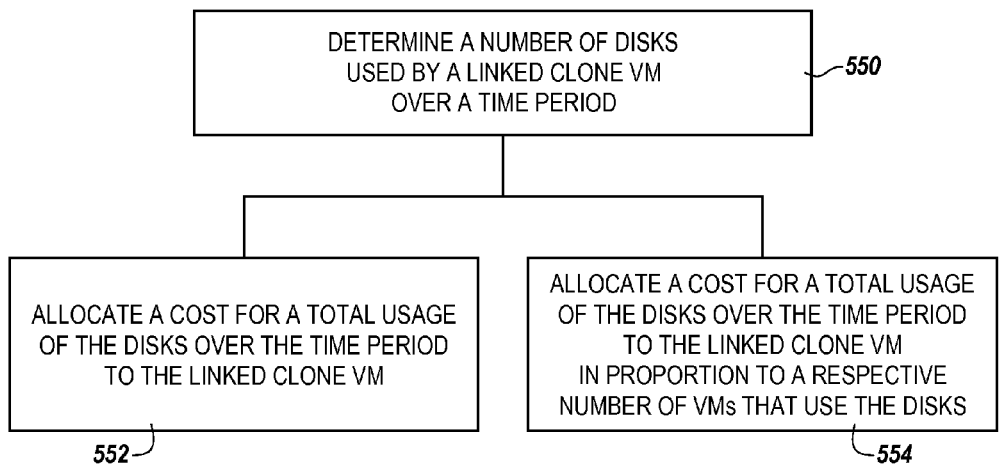
FIG. 5 is a flow chart illustrating one or more methods for allocating costs to linked clone virtual machines according to one or more embodiments of the present disclosure.

FIG. 5 is a flow chart illustrating one or more methods for allocating costs to linked clone virtual machines according to one or more embodiments of the present disclosure. In some embodiments, the flow chart can represent one method that has optional flows, for example, as illustrated from element 550 to element 552 or element 554. In some embodiments, the flow chart can represent two distinct methods: one that includes element 550 and element 552, and one that includes element 550 and element 554.

At 550 the method can include determining a number of disks used by a linked clone VM over a time period. From this point, a number of options are available. For example, at 552, the method can include allocating a cost for a total usage of the disks over the time period to the linked clone VM (e.g., regardless of whether the total usage over the time period includes usage by other VMs). In contrast, at 554, the method can include allocating a cost for a total usage of the disks over the time period to the linked clone VM in proportion to a respective number of VMs that use the disks.

In some embodiments, a method for allocating costs to linked clone VMs can include determining a first subset of a plurality of disks in a software defined data center, used by a first linked clone virtual machine (VM) during a time period. The method can include determining a second subset of the plurality of disks in the software defined data center used by a second linked clone VM during the time period. The first subset and the second subset can include a common disk. The method can include allocating a cost of a total usage of the first subset of disks to the first linked clone VM regardless of how many VMs use the first subset of disks (e.g., regardless of a portion of the total usage of the first subset of disks attributable to the first linked clone VM) and allocating a cost of a total usage of the second subset of disks to the second linked clone VM in proportion to a number of VMs using the second subset of disks (e.g., regardless of a portion of the total usage of the second subset of disks attributable to the second linked clone VM). That is, in some embodiments, different VMs can have costs allocated to them differently (e.g., total cost of usage of disks regardless of relative usage of the disks by other VMs and/or proportionate cost of usage of the disks relative to other VMs that use the disks).

In some embodiments, cost allocation can be done without regard to runtime parameters of the disks. As described herein, a VM can be deleted during a time period, but the VM can still have costs allocated to it for a time period when it was using a disk (and perhaps for a time period when it was not using a disk). For example, with respect to FIG. 4B, VM4 was deleted, but it could still have costs allocated to it for use of a disk at some point over time period t1-t3, as represented in the superimposed linked clone tree in FIG. 4D. Similarly, a VM can be cloned during the time period (e.g., from a parent VM) as described herein. For example with respect to FIG. 4C, VM6 can be a linked clone of VM2 in its state represented in disk D3. Thus, VM6 could have costs allocated to it for usage of a disk during the time period t1-t3.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a hardware logic configured to implement;
    a disk usage engine configured to determine, for a linked clone virtual machine (VM), a number of disks used by the linked clone VM among a plurality of disks in a software defined data center over a time period; and
    a cost engine configured to allocate, to the linked clone VM, a cost for a total usage of the number of disks over the time period, regardless of whether the total usage over the time period includes usage by other VMs, wherein the cost engine is configured to allocate the cost for the total usage of the number of disks based on a unit rate per unit time that is specific for each of the number of disks.

2. The system of claim 1, wherein the disk usage engine is configured to:
    build a linked clone tree for a number of VMs that use the plurality of disks during the time period,
    wherein each node in the tree represents one of the plurality of disks, and
    wherein each leaf in the tree represents a delta disk for one of the number of VMs; and
    for each leaf in the tree, determine a path from a root of the tree, wherein a particular path for a particular leaf includes a number of nodes representing disks used by one of the number of VMs corresponding to the particular leaf.

3. The system of claim 2, wherein the cost engine is configured to allocate a cost for a total usage of a particular one of the plurality of disks during the time period to each of the number of VMs that use any portion of the particular one of the plurality of disks.

4. A non-transitory machine-readable medium storing instructions executable by a processing resource to cause a computing system to:
    determine, for a disk among a plurality of disks in a software defined data center, a number of virtual machines (VMs), including at least one linked clone VM, that use the disk over a time period; and
    allocate a cost for a total usage of the disk to each of the number of VMs in proportion to the number of VMs that use the disk regardless of relative usage of the disk by each of the number of VMs;
    allocate the cost for the total usage of the disk based on a unit rate per unit time that is specific to the disk.

5. The medium of claim 4, including instructions to:
    build a linked clone tree for a plurality of VMs that use the plurality of disks during the time period,
    wherein each node in the tree represents one of the plurality of disks, and
    wherein each leaf in the tree represents a delta disk for one of the plurality of VMs; and
    for each leaf in the tree, determine a path from a root of the tree, wherein a particular path for a particular leaf includes a number of nodes representing a particular number of disks used by one of the plurality of VMs corresponding to the particular leaf.

6. The medium of claim 5, including instructions to allocate a cost for a total usage of the particular number of disks in proportion to a number of VMs using each of the particular number of disks to the one of the plurality of VMs corresponding to the particular leaf.

7. The medium of claim 5, wherein the instructions to determine the number of VMs, including the at least one linked clone VM, that use the disk comprise instructions to traverse the linked clone tree to determine a linked clone count for the disk.

8. The medium of claim 4, including instructions to:
    determine, for the at least one linked clone VM, a first disk and a second disk among the plurality of disks used by the linked clone VM over the time period;
    allocate, to the at least one linked clone VM, a cost for a total usage of the first disk over the time period in proportion to a total number of VMs that use the first disk over the time period; and
    allocate, to the at least one linked clone VM, a cost for a total usage of the second disk over the time period in proportion to a total number of VMs that use the second disk over the time period.

9. A system, comprising:
    a hardware logic configured to implement;
    a disk usage engine configured to:
    determine, for a particular linked clone virtual machine (VM), a number of disks, among a plurality of disks in a software defined data center, used by the linked clone VM during a time period;
    determine a respective number of linked clone VMs that use each of the number of disks during the time period;
    determine a usage of each of the number of disks during the time period; and a cost engine configured to allocate a cost of the usage of each of the number of disks to the particular linked clone VM in proportion to the respective number of linked clone VMs that use each of the number of disks during the time period.

10. The system of claim 9, wherein the cost engine is configured to allocate the cost of the usage of each of the number of disks based on at least one of a common unit rate per unit time for the number of disks and a respective unit rate per unit time specific to each of the number of disks.

11. The system of claim 9, wherein the disk usage engine is configured to build a linked clone tree for the number of linked clone VMs,
wherein each node in the tree represents one of the number of disks,
wherein each leaf in the tree represents a delta disk for one of the number of VMs, and
wherein one node in the tree is a root representing a common parent disk for the number of VMs.

12. The system of claim 11, wherein the disk usage engine being configured to determine the number of disks used by the linked clone VM comprises the disk usage engine being configured to:
for a particular leaf in the tree, determine a path from a root of the tree, wherein the path includes a number of nodes representing the number of disks used by the linked clone VM.

13. The system of claim 11, wherein the disk usage engine being configured to build the linked clone tree comprises the disk usage engine being configured to:
build a separate linked clone tree for each of a plurality of times during the time period; and
superimpose the plurality of linked clone trees into a single linked clone tree.

14. A method, comprising:
determining a first subset of a plurality of disks in a software defined data center, used by a first linked clone virtual machine (VM) during a time period;
determining a second subset of the plurality of disks in the software defined data center used by a second linked clone VM during the time period, wherein the first subset and the second subset include a common disk of the plurality of disks;
allocating a cost of a total usage of the first subset of disks to the first linked clone VM regardless of how many VMs use the first subset of disks; and
allocating a cost of a total usage of the second subset of disks to the second linked clone VM in proportion to a number of VMs using the second subset of disks.

15. The method of claim 14, wherein allocating the cost of the total usage of the first subset of disks to the first linked clone VM comprises allocating the cost regardless of a portion of the total usage of the first subset of disks attributable to the first linked clone VM.

16. The method of claim 15, wherein allocating the cost of the total usage of the second subset of disks to the second linked clone VM comprises allocating the cost regardless of a portion of the total usage of the second subset of disks attributable to the second linked clone VM.

17. The method of claim 14, wherein allocating the cost of the total usage of the first and the second subsets of disks comprises allocating the cost without regard to runtime parameters of the first and the second subsets of disks.

18. The method of claim 14, wherein the method includes deleting the first linked clone VM during the time period.

19. The method of claim 14, wherein the method includes cloning the first and the second linked clone VM from a parent VM during the time period.

20. A system, comprising:
a hardware logic configured to implement:
a disk usage engine configured to determine, for a linked clone virtual machine (VM), a number of disks used by the linked clone VM among a plurality of disks in a software defined data center over a time period; and
a cost engine configured to allocate, to the linked clone VM, a cost for a total usage of the number of disks over the time period, regardless of whether the total usage over the time period includes usage by other VMs,
wherein the cost engine is configured to allocate the cost for the total usage of the number of disks based on a unit rate per unit time that is common to the number of disks.

21. The system of claim 20, wherein the disk usage engine is configured to:
build a linked clone tree for a number of VMs that use the plurality of disks during the time period,
wherein each node in the tree represents one of the plurality of disks, and
wherein each leaf in the tree represents a delta disk for one of the number of VMs; and
for each leaf in the tree, determine a path from a root of the tree, wherein a particular path for a particular leaf includes a number of nodes representing disks used by one of the number of VMs corresponding to the particular leaf.

22. The system of claim 21, wherein the cost engine is configured to allocate a cost for a total usage of a particular one of the plurality of disks during the time period to each of the number of VMs that use any portion of the particular one of the plurality of disks.

* * * * *